Figure 1:
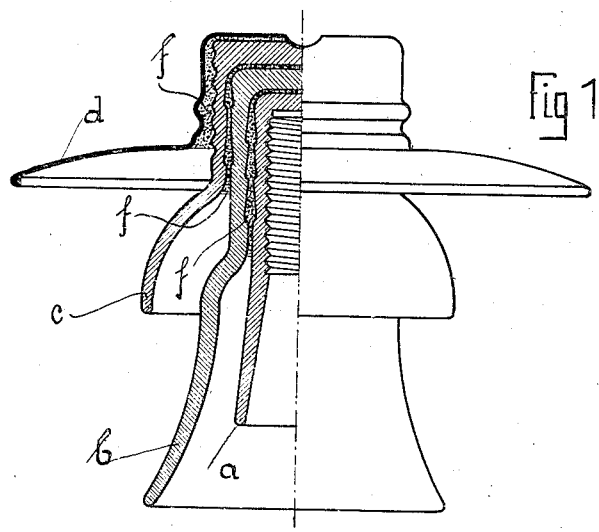

Dec. 26, 1922.

A. F. E. BÜLTEMANN.
PROCESS OF CONNECTING THE PARTS OF LINE INSULATORS.
FILED APR. 17, 1920.

1,440,003.

INVENTOR:
August F. E. Bültemann
By Wm Wallace White
ATTY.

Patented Dec. 26, 1922.

1,440,003

UNITED STATES PATENT OFFICE.

AUGUST FRIEDRICH ERNST BÜLTEMANN, OF DRESDEN, GERMANY.

PROCESS OF CONNECTING THE PARTS OF LINE INSULATORS.

Application filed April 17, 1920. Serial No. 374,735.

*To all whom it may concern:*

Be it known that I, AUGUST FRIEDRICH ERNST BÜLTEMANN, a citizen of Germany, and a resident of Dresden, Germany, have invented new and useful Improvements in Processes of Connecting the Parts of Line Insulators, of which the following is a specification.

In line insulators as used for electric long distance stations, which must be cemented together at various parts frequently, owing to their size, the disadvantage has made itself felt that these cemented insulators in the course of years show cracks and breakage. This occurrence, which caused extremely disagreeable interruptions in operation, was hitherto attributed to the different expansion of the porcelain and the cement, used as a' binding material, when subjected to the action of heat. The various attempts to eliminate the breakage have hitherto not been successful.

This invention is now based on the discovery that the cause of the breakage is not in the difference in heat expansion, but rather in enduring molecular stresses of the cement used, which expands, even after years, with great force and strength. Now in order to stop these inner molecular stresses of the cement in connection with insulator parts, the present invention is characterized by the fact that an insulator is constructed, provided with a cement between the insulator parts, and between the insulator parts and the metal fittings, consisting of an intimate mixture of hydraulically setting substances, chiefly cement, and a melting substance, contained therein in the form of a fine powder, for instance, asphalt, etc. To this mixture can be added other powdered or fibrous masses, such as asbestos, quartz powder, etc. This mixture is stirred with water, and is then placed firmly between the insulator parts to be joined, the hydraulic constituents are allowed to set or harden and the insulator is heated. The melting bodies then become liquid, enter the pores of the cement body, completely surround the same and cement the various parts of the insulator in a perfect manner.

Such a mixture of powdered or fibrous masses with melting substances has heretofore been used for other purposes, for instance for cementing household articles made of porcelain, china, earthenware, etc. It has also been suggested that such mixtures be used to manufacture electric insulating plates, etc. On the other hand, the present application consists in protecting electric line insulators consisting of several parts by the use of the described mixture as a cement, against the cracking, regularly caused hitherto by the continued molecular stresses of the cementing material, and thus making the insulators absolutely durable, whereas hitherto almost all insulators have had to be replaced again and again in the course of years.

The invention is based on the further fact that when cementing the action of the electric field in particular must be considered. In addition to preventing the continued stresses of the cement, it is essential that the cementing material used be an absolutely homogeneous substance. The cement paste used hitherto contains air pores and bubbles, so that it does not adhere uniformly at all points of contact. This produces strong, unbalanced load pressures in the field and is detrimental in that the cementing layer produces an irregular potential and energy distribution. An unfavorable action also results, if the dielectric constant and the coefficient of expansion of the cementing mass are different from those of the parts to be united.

By the use of a moist, intensive mixture of cement powder with pulverized fusible substances as the cementing mass, and then subjecting the mass to heat, the cement forms an absolutely homogeneous layer between the parts to be united, thereby preventing any irregular distribution of potential. The further detrimental results, described above, are eliminated in the new cement mass.

In order, for instance, to manufacture porcelain insulators consisting of several parts, under certain circumstances with the aid of a metal screen, Portland cement with the addition of asphalt powder can advantageously be used. The asphalt penetrates, when heated, into the smallest pores of the hardened cement, fills the air holes, sets closely to the walls of the fragments and prevents the cement from undergoing further molecular changes. When heating and cooling the insulator in operation, an elastic layer is formed by the addition of asphalt. The dielectric conductivity of this cement can be changed by special admixtures, and it may also be advisable to give the abutting surface of cement and porcelain a uniform load by good conductors, such as graphite, for instance.

Figure 2:
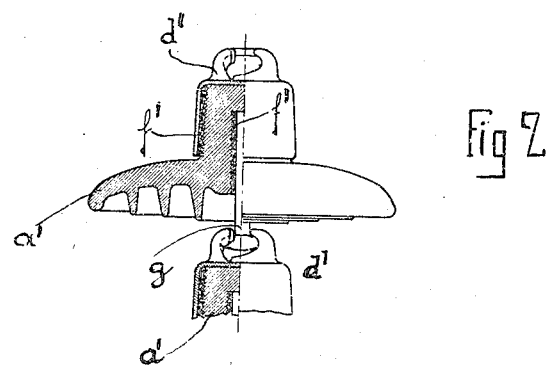

In the drawing attached hereto are illustrated two examples of the manner of utilizing the process herein described, in which, Fig. 1 is a side, partly sectional, elevation of a line insulator formed of three porcelain bells and a metallic cap or cover disposed one within the other and united by the cement formed according to the process of the present invention; and Fig. 2 is a similar view of a modified form of insulator, the parts of which are similarly united.

In Fig. 1, the porcelain bells a, b, and c, and the metallic cap or cover d, are superimposed one on the other with a layer f of cement formed by my improved process interposed between the porcelain members and between the outer member c and the metal cap d. In Fig. 2 is illustrated an insulated hanger in which each successive metal cap d' is secured to a porcelain member a' by means of a metal bolt g, a layer f' of the improved cement being interposed between the metallic cap and the porcelain, and also between the bolt and porcelain.

I claim as my invention:

The process of uniting the parts of a line insulator, which consists in inserting between said parts a plastic mixture of Portland cement and a finely pulverized fusible substance, permitting the cement to set, and heating the insulator thereby to melt the fusible substance and cause the same to penetrate the cement mass.

In testimony whereof I have signed my name to this specification.

Dr. AUGUST FRIEDRICH ERNST BÜLTEMANN.